US010437124B2

(12) United States Patent
Nomura

(10) Patent No.: US 10,437,124 B2
(45) Date of Patent: Oct. 8, 2019

(54) ELECTRO-OPTICAL DEVICE, ELECTRONIC APPARATUS, AND MOUNTING STRUCTURE

(71) Applicant: SEIKO EPSON CORPORATION, Tokyo (JP)

(72) Inventor: Takeshi Nomura, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 111 days.

(21) Appl. No.: 15/882,199

(22) Filed: Jan. 29, 2018

(65) Prior Publication Data
US 2018/0217466 A1 Aug. 2, 2018

(30) Foreign Application Priority Data

Feb. 2, 2017 (JP) ................................. 2017-017309

(51) Int. Cl.
G02F 1/1362 (2006.01)
G09G 3/36 (2006.01)
(Continued)

(52) U.S. Cl.
CPC ...... *G02F 1/136286* (2013.01); *G02F 1/1368* (2013.01); *G02F 1/13452* (2013.01); *G09G 3/36* (2013.01); *G09G 3/3648* (2013.01); *G09G 2300/0408* (2013.01); *G09G 2300/0426* (2013.01); *G09G 2310/0251* (2013.01); (Continued)

(58) Field of Classification Search
CPC .......... G02F 1/136286; G02F 1/13452; G02F 1/1368; G02F 1/133305; G02F 1/1345; G09G 3/36; G09G 3/3648; G09G 2300/0408; G09G 2300/0426; G09G 2310/0251; G09G 2310/0297; G09G 2320/0223; H01L 27/1203; H01L 27/1214;
(Continued)

(56) References Cited

U.S. PATENT DOCUMENTS 6,292,248 B1 * 9/2001 Lee ..................... G02F 1/13452
349/149
7,286,202 B2 * 10/2007 Yamaguchi ......... G02F 1/13452
257/E23.062
(Continued)

FOREIGN PATENT DOCUMENTS

JP 2004-252331 A 9/2004
JP 2006-100664 A 4/2006
(Continued)

*Primary Examiner* — Tom V Sheng
(74) *Attorney, Agent, or Firm* — Oliff PLC

(57) ABSTRACT

An electro-optical device includes: a wiring substrate connected to an electro-optical panel; and a driving IC mounted on the wiring substrate. The driving IC includes a first wiring line extending in one direction, and the wiring substrate includes a first reinforcing line connected to both ends of the first wiring line at a position overlapping the driving IC and electrically connected in parallel with the first wiring line. For example, the first wiring line extends from an input terminal to other terminals, and the wiring substrate includes a wiring line that supplies power to the input terminal via an electrode to which the input terminal is connected and a first reinforcing line connected to the electrodes to which the other respective terminals are connected.

20 Claims, 9 Drawing Sheets

(51) Int. Cl.
  *G02F 1/1368*  (2006.01)
  *G02F 1/1345*  (2006.01)
(52) U.S. Cl.
  CPC ............... *G09G 2310/0297* (2013.01); *G09G 2320/0223* (2013.01)
(58) Field of Classification Search
  CPC ............. H01L 27/3244; H01L 27/3276; H01L 27/3297
  See application file for complete search history.

(56) References Cited

U.S. PATENT DOCUMENTS

| | | | | |
|---|---|---|---|---|
| 7,626,671 | B2 * | 12/2009 | Kimura | G02F 1/1345 349/150 |
| 7,994,534 | B2 * | 8/2011 | Kim | H01L 51/5246 257/100 |
| 9,869,915 | B2 * | 1/2018 | Hashiguchi | G02F 1/136286 |
| 10,347,568 | B2 * | 7/2019 | Uchiyama | H01L 23/49524 |
| 2001/0038427 | A1 * | 11/2001 | Ueda | G02F 1/13452 349/74 |
| 2001/0046008 | A1 * | 11/2001 | Ueda | G02F 1/1347 349/74 |
| 2002/0117328 | A1 * | 8/2002 | Oishi | G02F 1/13452 174/254 |
| 2006/0109394 | A1 * | 5/2006 | Miyagawa | G02F 1/13452 349/58 |
| 2012/0217901 | A1 * | 8/2012 | Yamanaka | H01L 27/329 315/312 |
| 2014/0131718 | A1 * | 5/2014 | Xue | H01L 27/124 257/71 |
| 2017/0031512 | A1 * | 2/2017 | Zou | G06F 3/0416 |

FOREIGN PATENT DOCUMENTS

| | | | |
|---|---|---|---|
| JP | 2008-180848 | A | 8/2008 |
| JP | 2015-232590 | A | 12/2015 |

* cited by examiner

ELECTRO-OPTICAL DEVICE, ELECTRONIC APPARATUS, AND MOUNTING STRUCTURE

BACKGROUND

1. Technical Field

The present invention relates to an electro-optical device in which a driving IC is mounted on a wiring substrate connected to an electro-optical panel, an electronic apparatus including the electro-optical device, and a mounting structure in which a driving IC is mounted on a wiring substrate.

2. Related Art

An active driven-type liquid crystal device, which is an example of an electro-optical device, has been widely used for a light modulation mechanism (light valve) of a projection display device, and the like. In such an electro-optical device, a driving IC is mounted on a flexible wiring substrate connected to an electro-optical panel, and an image is displayed in accordance with an image signal output from the driving IC (refer to JP-A-2015-232590). Also, in the configuration of an electro-optical device described in JP-A-2015-232590, a precharge period is provided for each horizontal scanning period, and a precharge voltage is supplied to each pixel in the precharge period so as to prevent vertical crosstalk.

On the other hand, in an electro-optical device in which a driving IC is mounted on a glass wiring substrate used for an electro-optical panel, and a flexible wiring substrate is connected to the glass wiring substrate, a configuration of using a wiring line on the flexible wiring substrate in order to reinforce the wiring lines in the driving IC is described.

In an electro-optical device described in JP-A-2015-232590, in the configuration in which a precharge voltage is generated by an operational amplifier in a driving IC, the power source potential in the driving IC is likely to change at the time of precharging. On the other hand, when a precharge voltage is supplied to a driving IC via a flexible wiring substrate, there is a problem in that a precharge voltage output from each output circuit of the driving IC is likely to change due to the influence of the resistance of a wiring line on which the precharge voltage is supplied in the driving IC. Meanwhile, JP-A-2008-180848 describes a structure for reinforcing a wiring line in a driving IC. In such a configuration, a reinforcing wiring line on the glass wiring substrate—a reinforcing wiring line on the flexible wiring substrate—a reinforcing wiring line on the glass wiring line substrate are used. Accordingly, the length of wiring lines becomes long, and thus there is a problem in that it is not possible to sufficiently reduce the resistance, and the layouts of the reinforcing wiring lines on the glass wiring substrate and the flexible wiring substrate are largely restricted.

SUMMARY

An advantage of some aspects of the invention is that it provides an electro-optical device capable of suitably reinforcing a wiring line formed on a driving IC, an electronic apparatus, and a mounting structure.

According to an embodiment of the invention, there is provided an electro-optical device including: an electro-optical panel; a wiring substrate connected to the electro-optical panel; and a driving IC mounted on the wiring substrate, wherein the driving IC includes a first wiring line extending in one direction, and the wiring substrate includes a first reinforcing line disposed at a position overlapping the driving IC and electrically connected in parallel with the first wiring line.

In the electro-optical device according to the embodiment of the invention, the first reinforcing line formed on the wiring substrate is electrically connected in parallel with the first wiring line that extends in one direction in the driving IC, and thus the same advantage as that of reducing the resistance of the first wiring line is obtained. Accordingly, the voltage of the first wiring line is unlikely to change in one direction in which the first wiring line extends. Also, the first reinforcing line is disposed at the position overlapping the driving IC, and thus the layout of the first reinforcing line is unlikely affected by the influence of the other wiring lines on the wiring substrate. Also, the first reinforcing line is disposed at the position overlapping the driving IC, and thus the first reinforcing line unlikely affects the layout of the wiring lines on the wiring substrate. It is therefore possible to suitably reinforce the wiring line formed on the driving IC.

In the electro-optical device according to the embodiment of the invention, the first reinforcing line may be electrically connected to the ends on both sides of the first wiring line in the extending direction.

In the electro-optical device according to the embodiment of the invention, the wiring substrate may supply power to an end on the opposite side of the first wiring line in the one direction. In such a mode, an electrode and a terminal that supply a voltage from the wiring substrate to the first wiring line ought to be advantageously disposed at one point on the end of the driving IC.

In the electro-optical device according to the embodiment of the invention, the driving IC may include a plurality of output circuits arranged in the one direction, and the first wiring line may supply power to each of the plurality of output circuits.

In the electro-optical device according to the embodiment of the invention, the electro-optical panel may include a first pixel group in which a plurality of first pixel columns including a plurality of first pixels arranged along a first direction are arranged along a second direction crossing the first direction, a second pixel group in which a plurality of second pixel columns including a plurality of second pixels arranged along the first direction are arranged along the second direction, a selection circuit for selecting the first pixel column and the second pixel column to be supply destinations of an image signal from each of the first pixel group and the second pixel group, and the driving IC may include a first output terminal that outputs the image signal to be supplied to the first pixel group and a second output terminal that outputs an image signal to be supplied to the second pixel group at a separated position in the one direction, wherein the plurality of output circuits may output a precharge voltage supplied to the first pixel group and the second pixel group from the first wiring line via the first output terminal and the second output terminal. In the case of such a mode, the precharge voltage output from the first output terminal and the precharge voltage from the second output terminal are unlikely to vary.

In the electro-optical device according to the embodiment of the invention, the driving IC may include a first terminal to which the first wiring line is connected, a second terminal separated from the first terminal in the other direction crossing the one direction, and a third terminal separated from the first terminal and the second terminal in the one direction, and the wiring substrate may include a first electrode to which the first terminal is connected, a second electrode to which the second terminal is connected, a third electrode to which the third terminal is connected, and a wiring line supplying power to the first wiring line via the first electrode, and the first wiring line may include a first portion that connects the first terminal and the second terminal, a second portion extending from the first portion in the one direction, and a third portion extending from the second portion and is connected to the third terminal, wherein the first reinforcing line may be extending from the second electrode to the third electrode.

In the electro-optical device according to the embodiment of the invention, the first reinforcing line may be further extending from the first electrode to the second electrode.

In the electro-optical device according to the embodiment of the invention, the driving IC may include a first terminal to which the first wiring line is connected and a second terminal separated from the first terminal in the one direction, and the wiring substrate may include a first electrode to which the first terminal is connected, a second electrode to which the second terminal is connected, and a wiring line supplying power to the first wiring line via the first electrode, wherein the first wiring line may be extending from the first terminal to the second terminal, and the first reinforcing line may be extending from the first electrode to the second electrode.

In the electro-optical device according to the embodiment of the invention, the driving IC may include a second wiring line extending in the one direction, and the wiring substrate may include a second reinforcing wiring line disposed at a position overlapping the driving IC and electrically connected in parallel with the second wiring line.

In the electro-optical device according to the embodiment of the invention, the wiring substrate may be a single-layer substrate including wiring lines on a same metal layer. In the electro-optical device according to the embodiment of the invention, the wiring substrate may be a flexible wiring substrate.

In the electro-optical device according to the embodiment of the invention, a plurality of the wiring substrates including the driving IC mounted thereon may be connected to the electro-optical panel.

It is possible to use the electro-optical device according to the embodiment of the invention for various electronic apparatuses. When the electronic apparatus is a projection display device, the projection display device includes a light source section that emits light to be supplied to the electro-optical device and a projection optical system that projects light modulated by the electro-optical device.

According to another embodiment of the invention, there is provided a mounting structure including: a wiring substrate; and a driving IC mounted on one surface of the wiring substrate, wherein the driving IC includes a first wiring line extending in one direction, and the wiring substrate includes a first reinforcing line disposed at a position overlapping the driving IC and electrically connected in parallel with the first wiring line.

In the mounting structure according to the embodiment of the invention, the first reinforcing line formed on the wiring substrate is electrically connected in parallel with the first wiring line that extends in one direction in the driving IC, and thus the same advantage as that of reducing the resistance of the first wiring line is obtained. Accordingly, the voltage of the first wiring line is unlikely to change in one direction in which the first wiring line extends. Also, the first reinforcing line is disposed at the position overlapping the driving IC, and thus the layout of the first reinforcing line is unlikely affected by the influence of the other wiring lines on the wiring substrate. Also, the first reinforcing line is disposed at the position overlapping the driving IC, and thus the first reinforcing line unlikely affects the layout of the wiring lines on the wiring substrate. It is therefore possible to suitably reinforce the wiring line formed on the driving IC.

In the mounting structure according to the embodiment of the invention, the driving IC may further include a second wiring line extending in the one direction, and the wiring substrate may further include a second reinforcing wiring line disposed at a position overlapping the driving IC and electrically connected in parallel with the second wiring line.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
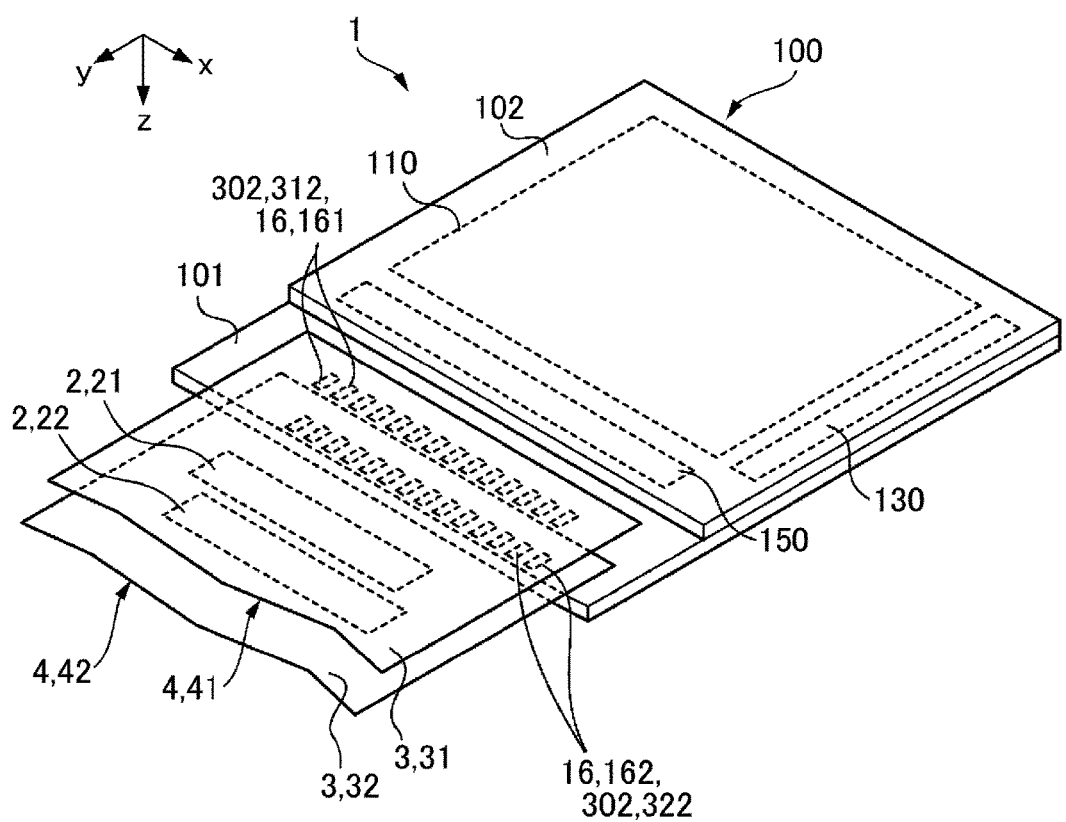
FIG. 1 is an explanatory diagram schematically illustrating a mode of an electro-optical device to which the invention is applied.

A description will be given of embodiments of the invention with reference to the drawings. In this regard, in the drawings referenced by the following description, the drawing scale for each member is different in order for each member, or the like to be recognizable in the drawings.

Configuration of Electro-Optical Device

Basic Configuration

FIG. 1 is an explanatory diagram schematically illustrating a mode of an electro-optical device 1 to which the invention is applied. The electro-optical device 1 illustrated in FIG. 1 is a liquid crystal device used for a light valve described later, or the like. The electro-optical device 1 includes a liquid crystal panel as an electro-optical panel 100. The electro-optical panel 100 is produced by bonding an element substrate 101 on which pixel electrodes (not illustrated in FIG. 1), and the like are formed with a counter substrate 102 on which common electrodes (not illustrated in FIG. 1), and the like are formed using a sealing material (not illustrated in FIG. 1). In the electro-optical panel 100, a liquid crystal material (not illustrated in FIG. 1) is disposed in an area surrounded by the sealing material. The electro-optical panel 100 in the present embodiment is a transmissive liquid crystal panel. Accordingly, a light-transmitting substrate, such as a heat resistant glass, a quartz substrate, or the like is used for the element substrate 101 and the counter substrate 102.

In the electro-optical device 1 according to the present embodiment, a wiring substrate 3 (mounting structure 4/mount substrate) on which a driving IC 2 is mounted is connected to the element substrate 101 of the electro-optical panel 100, and the driving IC 2 outputs an image signal, and the like to the electro-optical panel 100 via the wiring substrate 3. Accordingly, a plurality of output electrodes 302 are formed at the positions overlapping the element substrate 101 at the end of the wiring substrate 3. On the other hand, a plurality of terminals, such as image signal input terminals 16, and the like to which a plurality of output electrodes 302 are connected respectively are formed at the end of the element substrate 101. In the present embodiment, a plurality of wiring substrates 3 (mounting structures 4) on which the driving IC 2 is mounted are connected. More specifically, a first wiring line substrate 31 (first mounting structure 41) on which a first driving IC 21 is mounted, and a second wiring line substrate 32 (second mounting structure 42) on which a second driving IC 22 is mounted are connected to the element substrate 101. The first driving IC 21 and the second driving IC 22 output image signals to the electro-optical panel 100 via the first wiring line substrate 31 and the second wiring line substrate 32 respectively. Accordingly, a plurality of output electrodes 312 (output electrodes 302) are formed at the positions overlapping the element substrate 101 at the end of the first wiring line substrate 31. On the other hand, a plurality of terminals, such as image signal input terminals 161 (image signal input terminals 16), and the like are formed at the end of the element substrate 101. Also, a plurality of output electrodes 322 (output electrodes 302) are formed at the position overlapping the element substrate 101 at the end of the second wiring line substrate 32. On the other hand, a plurality of terminals, such as image signal input terminals 162 (image signal input terminals 16), and the like are formed at the end of the element substrate 101. The image signal input terminals 161 and 162 are arranged along the edge of the element substrate 101 at the positions that are shifted with each other in the y-direction. Also, the image signal input terminals 161 and the image signal input terminal 162 are shifted with each other in the x-direction.

A single-sided wiring substrate is used for the wiring substrate 3 (the first wiring line substrate 31 and the second wiring line substrate 32). For the wiring substrate 3, either a single-layer substrate on which wiring lines are formed on the same metal layer or a multi-layer substrate including wiring lines in a plurality of metal layers may be used. However, in the present embodiment, the wiring substrate 3 is formed by a single-layer substrate. The wiring substrate 3 (the first wiring line substrate 31 and the second wiring line substrate 32) is formed by a flexible wiring substrate. The wiring substrate 3 (the first wiring line substrate 31 and the second wiring line substrate 32) is therefore a so-called COF (Chip On Film).

Electrical Configuration of Electro-Optical Device

Figure 2:
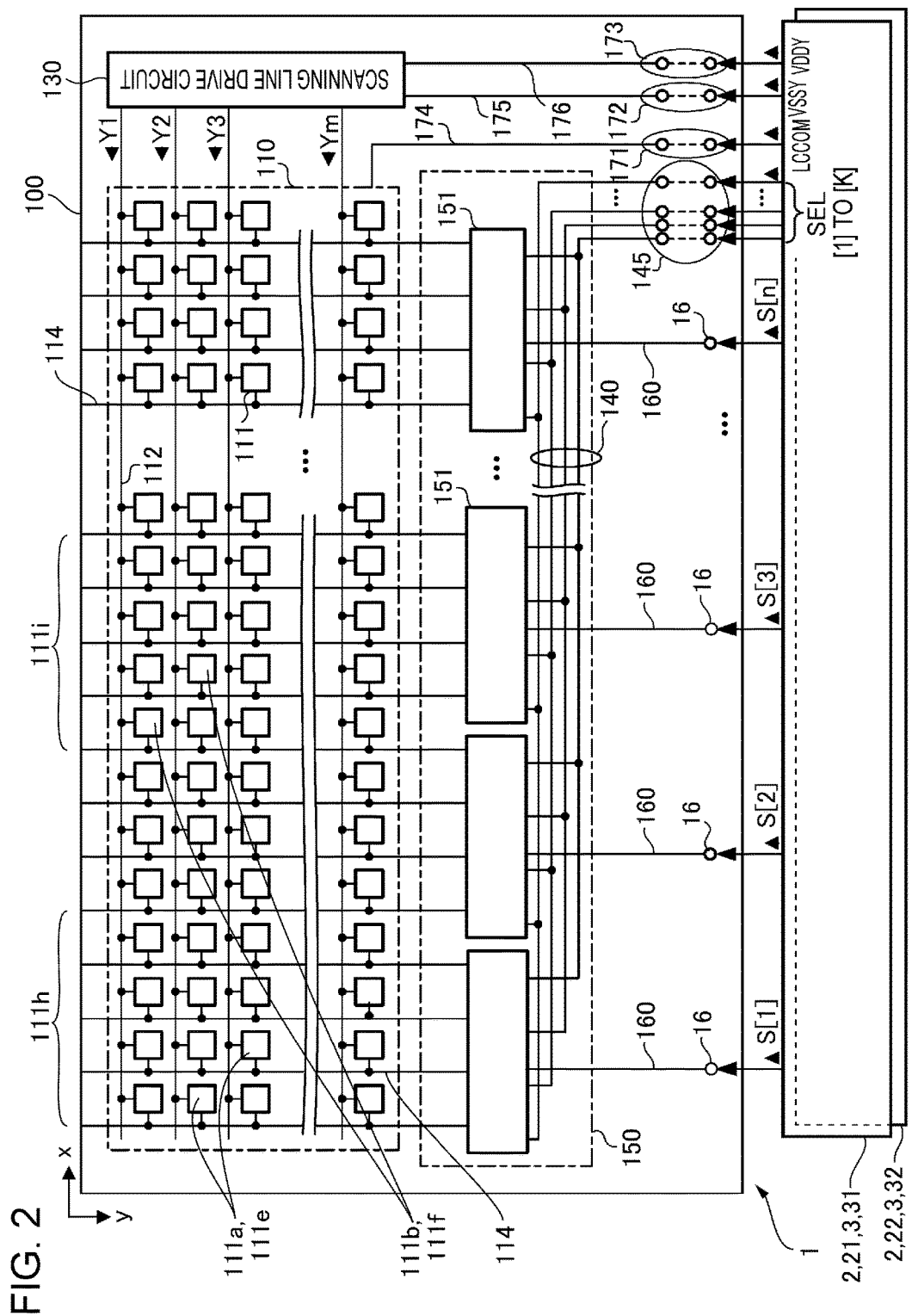
FIG. 2 is an explanatory diagram illustrating the electrical configuration of the electro-optical device illustrated in FIG. 1.

FIG. 2 is an explanatory diagram illustrating the electrical configuration of the electro-optical device 1 illustrated in FIG. 1. As illustrated in FIG. 2, the electro-optical panel 100 includes a display area 110, a scanning line drive circuit 130, a data-line selection circuit 150 (selection circuit), n image signal lines 160, n image signal input terminals 16, k selection signal lines 140, k selection signal input terminals 145, a plurality of power source terminals 171, 172, and 173, power lines 174, 175, and 176 corresponding to the power source terminals 171, 172, and 173. Reference sign n is an integer of 1 or more, and k is an integer of 2 or more. In the configuration illustrated in FIG. 2, k=4. The above-described elements are formed on the element substrate 101 illustrated in FIG. 1. On the element substrate 101, the data-line selection circuit 150 is formed along one side of the peripheral portion of the display area 110, and the scanning line drive circuit 130 is formed along the other side that crosses the side on which the data-line selection circuit 150 is formed.

The first driving IC 21 and the second driving IC 22 output an image signal that displays an image on the electro-optical panel 100 in accordance with a clock signal, a control signal, image data, and the like that are input from an external upper circuit (not illustrated in the figure) via the first wiring substrate 31 and the second wiring line substrate 32 (refer to FIG. 1). The electro-optical panel 100 displays an image in accordance with the clock signal and the image signal that are input from the first driving IC 21, the first wiring line substrate 31, the second driving IC 22, and the second wiring line substrate 32. The first driving IC 21 and the second driving IC 22 have the same configuration, and output the same signal other than the image signal.

The display area 110 is an area in which an image is displayed. The display area 110 includes m scanning lines 112, (k×n) data lines 114, and (m×k×n) pixels 111. Reference sign m is an integer of 1 or more. The pixels 111 are disposed correspondingly to the intersections of the scanning lines 112 and the data lines 114, and arranged in a matrix having m rows and (k×n) columns. The scanning lines 112 are signal lines on which scanning signals Y1, Y2, Y3 . . . , Ym are transmitted, and disposed from the scanning line drive circuit 130 along the row direction (x-direction). The data lines 114 are signal lines on which data signals are transmitted, and disposed from the data-line selection circuit 150 along the column direction (y-direction).

In the display area 110, k×m pixels 111 corresponding to k (columns) data lines 114 constitute one pixel group (block). For example, a first pixel group 111h in which a plurality of (k columns of) first pixel columns 111e including an array of a plurality of (m) first pixels 111a in the y-direction are arranged in the X-direction, and a second pixel group 111i in which a plurality of (k columns of) second pixel columns 111f including an array of a plurality of (m) second pixels 111b in the y-direction are arranged in the X-direction are disposed. Here, the pixels 111 included in the same pixel group are connected to the same image signal line 160 via the data-line selection circuit 150. Accordingly, the electro-optical panel 100 includes n (columns of) pixel groups, which are produced by being partitioned into n blocks by n (columns of) image signal lines 160 or n image signal input terminals 161.

In the following description, when it is necessary to distinguish each of the plurality of scanning lines 112, they are denoted by the scanning line 112 of the first row, the second row, the third row, . . . , and the m-th row. When it is necessary to distinguish each of the plurality of data lines 114, they are denoted by the data line 114 of the first column, the second column, the third column, . . . , and the (k×n)-th column. The same notation is applied to the image signal lines 160.

The scanning line drive circuit 130 selects a row in which data is to be written from the plurality of pixels 111 arranged in the matrix. Specifically, the scanning line drive circuit 130 outputs a scanning signal for selecting one of the scanning lines 112 from the plurality of scanning lines 112. The scanning line drive circuit 130 supplies scanning signals Y1, Y2, Y3, . . . , Ym to the scanning lines 112 of the first row, the second row, the third row, . . . , and the m-th row. The scanning signal Y1, Y2, Y3, . . . , Ym are signals that exclusively becomes a high level in sequence, for example.

The data-line selection circuit 150 selects a column (pixel column) of pixels 111 in which an image signal is to be written in each pixel group. Specifically, the data-line selection circuit 150 selects at least one of the data lines 114 out of the k data lines 114 included in the pixel group in accordance with selection signals SEL[1] to SEL[k]. Each one of the data lines 114 is connected to a respective one of the image signal lines 160 by the data line selection circuit 150 in units of k pieces. In the present embodiment, the data line selection circuit 150 includes n demultiplexers 151 corresponding to n pixel groups respectively. The detailed configurations of the demultiplexer 151 and the pixel 111 will be described later with reference to FIG. 3.

The image signal lines 160 connect the image signal input terminals 16 and the data-line selection circuits 150 respectively. The image signal lines 160 are signal lines that transmit image signals S(S[1] to S[n]) input from the first wiring line substrate 31 and the second wiring substrate 32 to data-line selection circuit 150 via the image signal input terminals 16. For each of n image signal input terminals 16 or n pixel groups, a corresponding one of n columns of (pieces of) image signal lines 160 is provided. The image signal S is a signal indicating data to be written into the pixel 111. Here, an "image" refers to a still image or a moving image. One image signal line 160 is connected to a corresponding one of data lines 114 via the data-line selection circuit 150. Accordingly, data on the image signals S is subjected to time division multiplexing so as to be supplied to the k data lines 114.

The selection signal lines 140 connect the selection signal input terminals 145 and demultiplexers 151 of the data-line selection circuits 150 respectively. The selection signal lines 140 (140[1] to 140[k]) are signal lines that transmit selection signals SEL (SEL[1] to SEL[k]) that are input from the selection signal input terminals 145 (145[1] to 145[k]) respectively, and k selection signal lines 140 are provided. The selection signals SEL are signals that become a high level in sequence.

The image signal input terminals 16 are terminals (electrode pads) to which the first wiring line substrate 31 and the second wiring line substrate 32 are connected, and are supplied with image signals S[j] (j is an integer that satisfies 1≤j≤n). In this example, the first driving IC 21 supplies the image signal input terminals 16 corresponding to the image signal lines 160 of the odd-numbered columns, namely the first column, the third column, the fifth column, . . . , and the (2t−1)-th column with the image signals S[1], S[3], S[5], . . . S[2t−1] respectively (t is an integer that satisfies 1≤t≤n/2). Also, the second driving IC 22 supplies the image signal input terminals 16 corresponding to the image signal lines 160 of the even-numbered columns, namely the second column, the fourth column, the sixth column, . . . , and the (2t)-th column with the image signals S[2], S[4], S[6], . . . , and S[2t] respectively. The image signals S are so-called data signals, and the image signal input terminals 16 are supplied with analog signals having different waveforms in accordance with the display of an image.

The selection signal input terminals 145 are terminals (electrode pads) connected to the first wiring line substrate 31 and the second wiring line substrate 32 and are supplied with selection signals SEL that are pulse signals respectively. The selection signals SEL are timing signals for selecting a data line 114 in the data-line selection circuit 150. The selection signal input terminals 145 include the terminals connected to the first wiring line substrate 31 and the terminals connected to the second wiring line substrate 32 and supplied with selection signals SEL from both or one of the first driving IC 21 of the first wiring line substrate 31 and the second driving IC 22 of the second wiring line substrate 32. In the present embodiment, the selection signals SEL having the same waveform are supplied to the selection signal input terminals 145 corresponding to each of the first wiring line substrate 31 and the second wiring line substrate 32. Accordingly, the selection signal input terminals 145 are illustrated by not distinguishing the terminals connected to the first wiring line substrate 31 from the terminals connected to the second wiring line substrate 32.

The power source terminal 171, the power source terminal 172, and the power source terminal 173 are the terminals (electrode pads) connected to the first wiring line substrate 31 and the second wiring line substrate 32, and supplied with a power source voltage from the upper circuit via the first wiring line substrate 31 and the second wiring line substrate 32 without going through the first driving IC 21 and the second wiring substrate 32 respectively. The power source voltage is a voltage used as a power source in the electro-optical panel 100 and is a direct current voltage in this example. The power source terminal 171 is a terminal for supplying a voltage LCCOM, the power source terminal 172 is a terminal for supplying a voltage VSSY, and the power source terminal 173 is a terminal for supplying a voltage VDDY. The voltage LCCOM is a voltage that becomes a reference potential of the voltage applied to the liquid crystal layer. The voltage VSSY is a voltage that becomes a power source potential of the low voltage-side in the scanning line drive circuit 130. The voltage VDDY is a voltage that becomes a power source potential of the high voltage-side in the scanning line drive circuit 130.

Each of the power source terminals 171, 172, and 173 is sometimes disposed on both sides in the x-direction. This configuration corresponds to the configuration of disposing the scanning line drive circuits 130 on both of the right and the left sides of the element substrate 101. In the present embodiment, one scanning line drive circuit 130 is disposed, and thus the power source terminals 172, 173 are disposed on one side in the x-direction.

Configurations of Demultiplexer and Pixel

Figure 3:
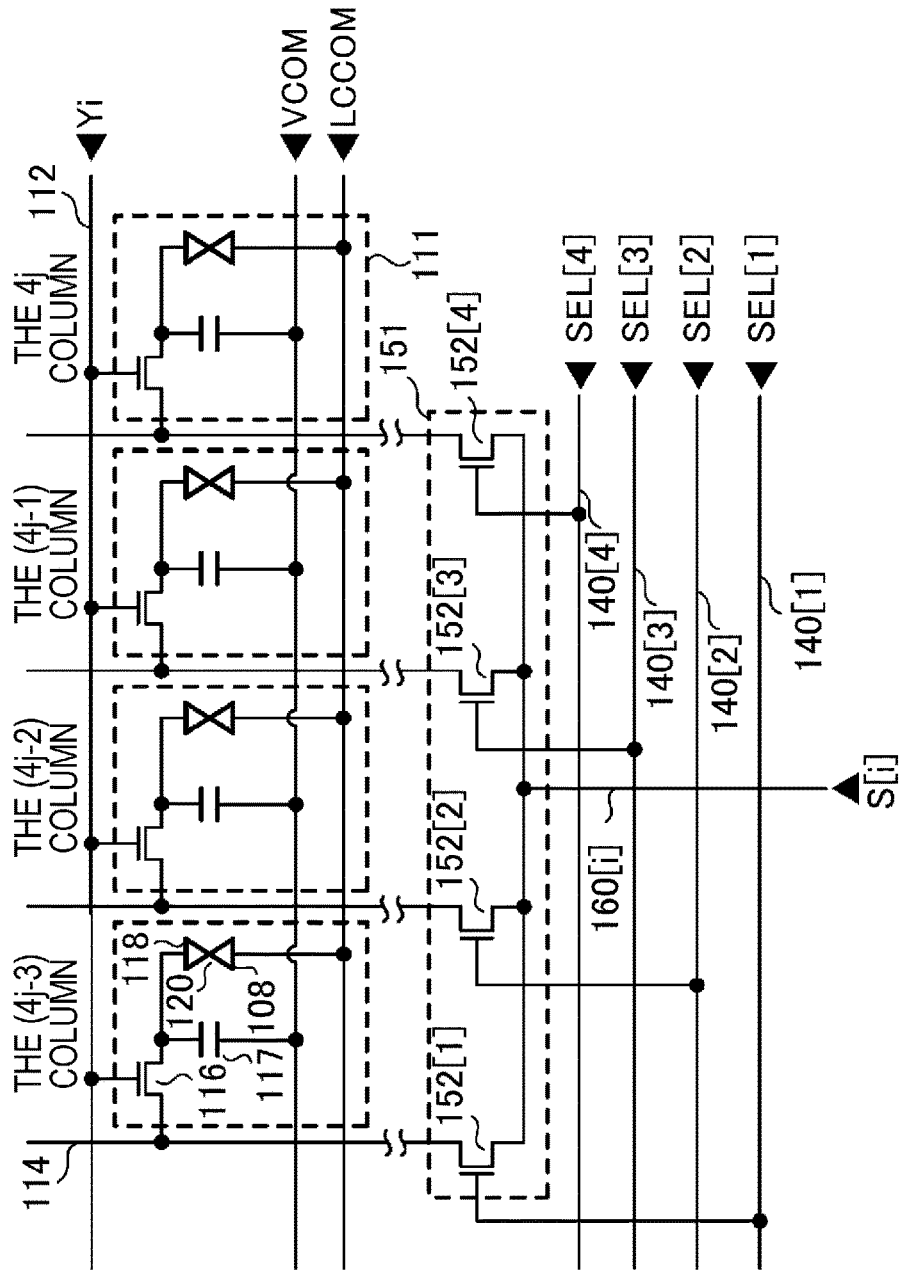
FIG. 3 is an explanatory diagram illustrating the configuration of the pixels and the data-line selection circuit illustrated in FIG. 2.

FIG. 3 is an explanatory diagram illustrating the configuration of the pixel 111 and the data-line selection circuit 150 illustrated in FIG. 2. In FIG. 3, the pixels 111 in the i-th row and from the (k×j−k+1)-th column to the (k×j)-th column in the display area 110 and the demultiplexer 151 corresponding thereto are illustrated (i is an integer that satisfies 1≤i≤m).

The pixel 111 includes a pixel switching element 116 made of a TFT (Thin Film Transistor), or the like, a pixel electrode 118, a liquid crystal layer 120, a common electrode 108, and a holding capacitor 117. The pixel switching element 116 is a switching element that controls writing data (application of a voltage) on the pixel electrode 118, and in the present embodiment, the pixel switching element 116 is an n-channel field-effect transistor. The gate electrode of the pixel switching element 116 is connected to the scanning line 112, the source electrode is connected to the data line 114, and the drain electrode is connected to the pixel electrode 118. When a high-level scanning signal is supplied to the scanning line 112, the pixel switching element 116 becomes an on state, and an image signal is supplied to the pixel electrode 118. When a low-level scanning signal is supplied to the scanning line 112, the pixel switching element 116 becomes an off state. The common electrode 108 is common to all the pixels 111. The common voltage LCCOM is applied to the common electrode 108. A voltage corresponding to the potential difference between the pixel electrode 118 and the common electrode 108 is applied to the liquid crystal layer 120, and the optical characteristic (transmittance ratio or reflectance ratio) changes in accordance with this voltage. The holding capacitor 117 holds charge corresponding to the potential difference between the pixel electrode 118 and a common voltage VCOM. In the present embodiment, the common voltage VCOM and the common voltage LCCOM are equal. In the following, when each element included in the pixel 111 in a specific pixel group is distinguished, a notation such as a pixel switching element 116[s] is used for the distinction (s is an integer that satisfies 1≤s≤k).

The demultiplexer 151 is a circuit that supplies an image signal S to the data line 114 selected in accordance with the selection signals SEL[1] to SEL[k]. For example, the demultiplexer 151 selects a first pixel column 111e and a second pixel column 111f, which become the supply destination of the image signal, from each of the first pixel group 111h and the second pixel group 111i illustrated in FIG. 2 respectively. The demultiplexer 151 is supplied with the image signal S input from the image signal input terminal 16 via the image signal line 160. One demultiplexer 151 includes one image signal input section, k selection signal input sections, k image signal output sections, and k switching elements 152 (152[1] to 152[k]). The demultiplexer 151 is connected to one image signal input terminal 161 via the image signal line 160, k selection signal input terminals 145 (145[1] to 145[k]) via the selection signal line 140, and k data lines 114. The switching element 152 is a switching element for selecting a data line 114 (pixel column) in accordance with the selection signal SEL input to the gate.

The gate electrode of the switching element 152[1] is connected to the selection signal line 140[1], the source electrode is connected to the image signal line 160 of the j-th column, and the drain electrode is connected to the data line 114 (that is to say, the source electrode of the pixel switching element 116[1] of the j-th pixel group) of the (4j-3)-th column. When the high-level selection signal SEL[1] is supplied to the selection signal line 140[1], the switching element 152 becomes the on state, the j-th column image signal line 160 and the (4j-3)-th column data line 114 become the low impedance state and are conducted. That is to say, the (4j-3)-th column data line 114 is supplied with the image signal S[j]. When the selection signal line 140[1] is supplied with the low-level selection signal SEL[1], the switching element 152[1] becomes the off state, and the j-th column image signal line 160 and the (4j-3)-th column data line 114 become the high impedance state.

The gate electrode of the switching element 152[2] is connected to the selection signal line 140[2], the source electrode is connected to the j-th column image signal line 160, and the drain electrode is connected to the (4j-2)-th column data line 114. When the selection signal line 140[2] is supplied with the high-level selection signal SEL[2], the switching element 152[2] becomes the on state, and the j-th column image signal line 160 and the (4j-2)-th column data line 114 are conducted. That is to say, the (4j-2)-th column data line 114 is supplied with the image signal S[j]. When the selection signal line 140[2] is supplied with the low-level selection signal SEL[2], the switching element 152[2] becomes the off state, and the j-th column image signal line 160 and the (4j-2)-th column data line 114 become the high impedance state.

The gate electrode of the switching element 152[3] is connected to the selection signal line 140[3], the source electrode is connected to the j-th column image signal line 160, and the drain electrode is connected to the (4j-1)-th column data line 114 (that is to say, the source electrode of the pixel switching element 116[3] of the j-th pixel group). When the selection signal line 140[3] is supplied with the high-level selection signal SEL[3], the switching element 152[3] becomes the on state, and the j-th column image signal line 160 and the (4j-1)-th column data line 114 are conducted. That is to say, the (4j-1)-th column data line 114 is supplied with the image signal S[j]. When the selection signal line 140[3] is supplied with the low-level selection signal SEL[3], the switching element 152[3] becomes the off state, and the j-th column image signal line 160 and the (4j-1)-th column data line 114 become the high impedance state.

The gate electrode of the switching element 152[4] is connected to the selection signal line 140[4], the source electrode is connected to the j-th column image signal line 160, and the drain electrode is connected to the 4j-th column data line 114 (that is to say, the source electrode of the pixel switching element 116[4] of the j-th column pixel group). When the selection signal line 140[4] is supplied with the high-level selection signal SEL[4], the switching element 152[4] becomes the on state, and the j-th column image signal line 160 and the 4j-th column data line 114 are conducted. That is to say, the 4j-th column data line 114 is supplied with the image signal S[j]. When the selection signal line 140[4] is supplied with the low-level selection signal SEL[4], the switching element 152[4] becomes the off state, and the j-th column image signal line 160 and the 4j-th column data line 114 become the high impedance state.

Operation

Figure 4:
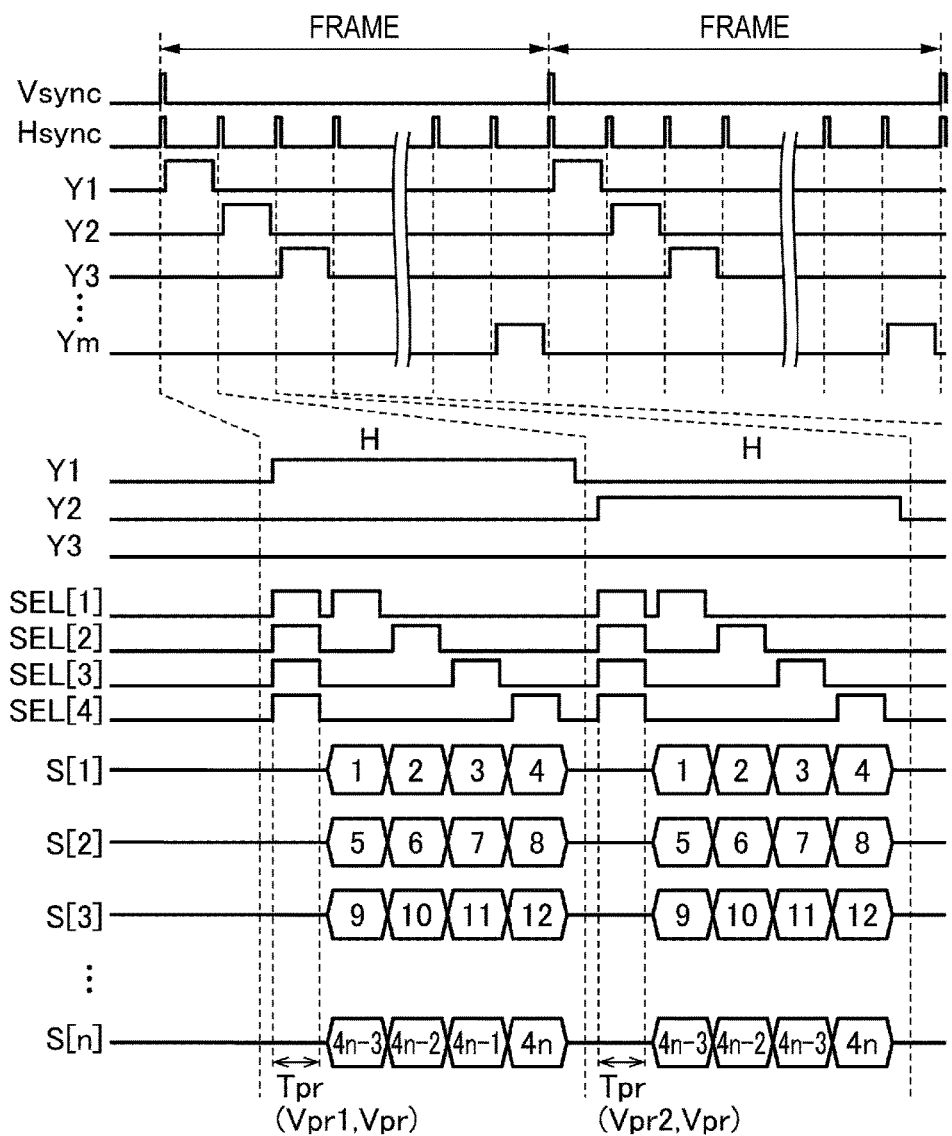
FIG. 4 is a timing chart illustrating an example of operation of the electro-optical device illustrated in FIG. 1.

FIG. 4 is a timing chart illustrating an example of operation of the electro-optical device 1 illustrated in FIG. 1. In FIG. 4, a horizontal synchronization signal Hsync, the scanning signals Y1, Y2, Y3 . . . , and Ym, and the selection signals SEL[1] to [k] and the image signals S[1] to [n] that correspond to the timing of the high level of the scanning signals Y1, Y2, Y3, . . . , Ym.

The image signal S[j] is time-division multiplexed with data to be written in the pixels 111 in the [k×j−k+1] to the [k×j]-th columns, which are k pixels 111 in the corresponding pixel group. Also, if S[j] is an odd-numbered S[2t−1], S[j] is supplied to the data lines 114 in the odd-numbered pixel groups from the first driving IC 21. Also, if S[j] is an even-numbered S[2t], S[j] is supplied to the data lines 114 in the even-numbered pixel groups from the second driving IC 22. With such a configuration, since two driving ICs, namely the first driving IC 21 and the second driving IC 22 are used, it is possible to write data in two times the number of pixels in one period compared with the case of using one driving IC.

When an image is displayed in accordance with the timing chart illustrated in FIG. 4, in the present embodiment, a precharge period Tpr is provided for each one horizontal scanning period H, and the image signals S1 to S(n) are set to a precharge voltage Vpr in the precharge period Tpr. The precharge voltage Vpr is output from the first driving IC 21 and the second driving IC 22 in the same manner as the image signals S1 to S(n). Also, the selection signals SEL[1] to SEL[k] become the high level in the precharge period Tpr. Accordingly, the precharge voltage Vpr is supplied to all the data lines 114 for each one horizontal scanning period H via the data-line selection circuit 150, and after that, the image signals S1 to S[n] are supplied respectively.

In the embodiment, in the electro-optical device 1, a drive method in which the polarities of the image signals S1 to S(n) are inverted for each one frame is employed. Accordingly, a positive-polarity first precharge voltage Vpr1 is supplied to all the data lines 114 in a precharge period Tpr, and the in the next horizontal scanning period H, a negative-polarity second precharge voltage Vpr2 is supplied to all the data lines 114 in the precharge period Tpr.

Configuration of Driving IC

Figure 5:
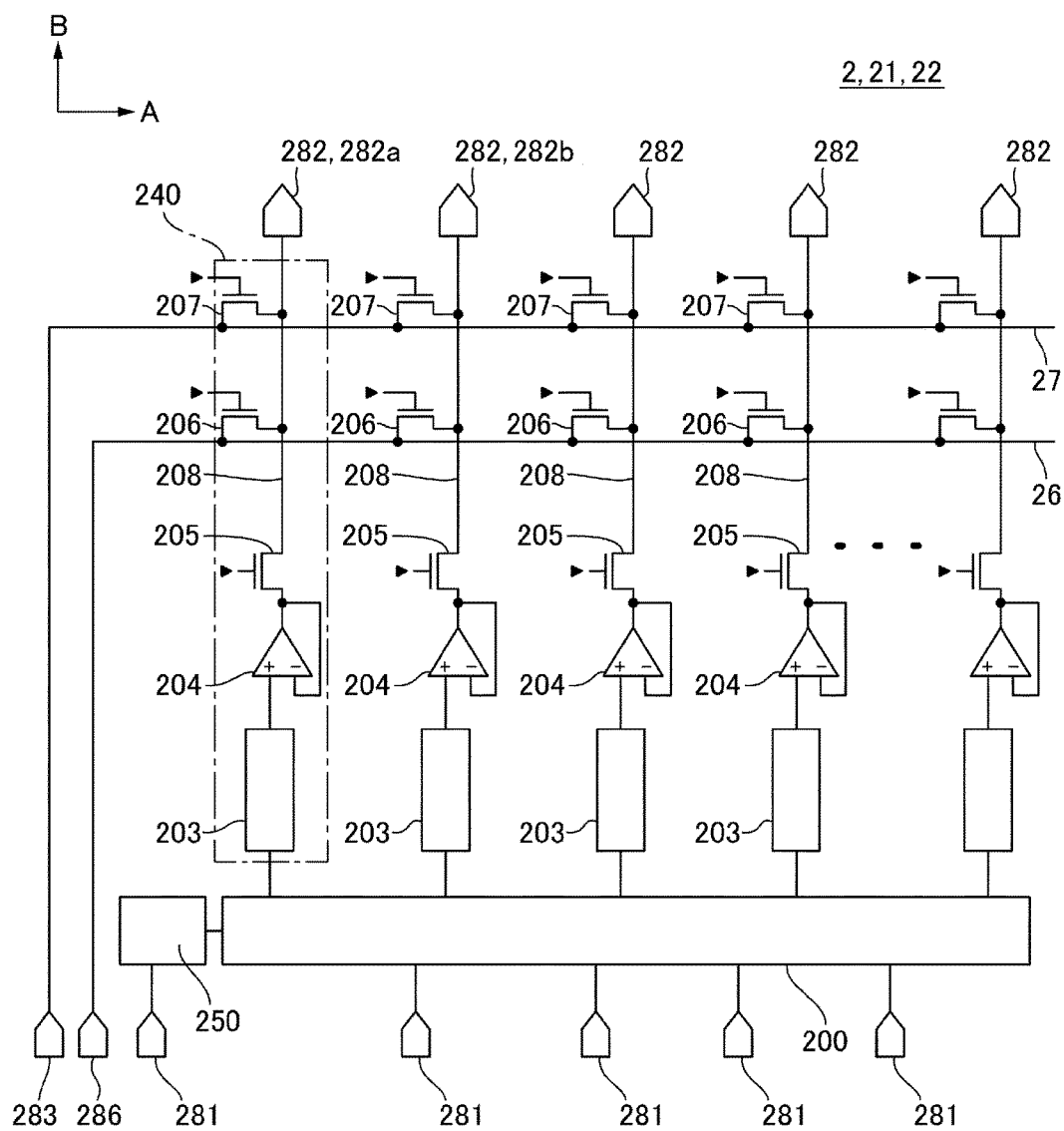
FIG. 5 is an explanatory diagram illustrating the configuration of the driving IC illustrated in FIG. 1.

A description will be given of the configuration of the driving IC 2 illustrated in FIG. 1 with reference to FIG. 5. FIG. 5 is an explanatory diagram illustrating the configuration of the driving IC 2 illustrated in FIG. 1. In this regard, in the following description, since the first driving IC 21 and the second driving IC 22 have the same configuration, a description will be given as a driving IC 2 without distinguishing the first driving IC 21 and the second driving IC 22. Also, in FIG. 5, only a portion related to an output circuit 240 of the image signal out of the wiring lines, the circuits, and the like formed on the driving IC 2 is illustrated in order for the characteristic thereof to be easily understood.

In FIG. 5, the driving IC 2 (the first driving IC 21 and the second driving IC 22) includes a plurality of (n/2) output circuits 240 that output an image signal, a data processing circuit 200 that converts image data for one frame into digital data for each one horizontal scanning period H and outputs the digital data to the output circuits 240, and a control circuit 250 that controls timing to output various signals and voltages. Various kinds of data and signals are input into the data processing circuit 200 and the control circuit 250 from the wiring substrate 3 illustrated in FIG. 1 via the input terminals 281 of the driving IC 2. The plurality of output circuits 240 are arranged in one direction A of the driving IC 2, and the direction A is a direction along the long side of the driving IC 2. In this regard, although the illustration is omitted in FIG. 5, a generation circuit of selection signals SEL and an output circuit are also formed on the driving IC 2.

Each of the plurality of output circuits 240 includes a DA conversion circuit 203 that converts the digital data output from the data processing circuit 200 into an analog signal and an operational amplifier 204 that amplifies the analog signal output from the DA conversion circuit 203. The end of the output line 208 extending from the operational amplifier 204 in the other direction B (the direction crossing the direction A; the direction along the short side of the driving IC 2) is connected to the output terminal 282 of the driving IC 2. A switch 205 is inserted at the middle position of the output line 208, and the switch 205 performs switch operation under the control of the control circuit 250. In this regard, out of the output terminals 282, a first output terminal 282a outputs an image signal to the first pixel group 111h illustrated in FIG. 2, and a second output terminal 282b outputs an image signal to the second pixel group 111i illustrated in FIG. 2.

In the driving IC 2, a first wiring line 26 extends in one direction A. The first wiring line 26 is supplied with the positive-polarity first precharge voltage Vpr1 from the wiring substrate 3 illustrated in FIG. 1 via the input terminal 283 of the driving IC 2. The first wiring line 26 is connected to a portion that connects the switch 205 of all the output lines 208 and the output terminal 282 via the switch 206. The switch 206 performs switch operation under the control of the control circuit 250.

Also, in the driving IC 2, a second wiring line 27 extends in one direction A, and the second wiring line 27 is supplied with the negative-polarity second precharge voltage Vpr2 from the wiring substrate 3 illustrated in FIG. 1 via the input terminal 286 of the driving IC 2. The second wiring line 27 is connected to a portion that connects the switch 205 of all the output lines 208 and the output terminal 282 via the switch 207. The switch 207 performs switch operation under the control of the control circuit 250.

Accordingly, in the precharge period illustrated in FIG. 4, when the switch 206 is turned on, and the switches 205 and 207 are turned off, the driving IC 2 outputs the first precharge voltage Vpr1 to the electro-optical panel 100 via the output line 208, the output terminal 282, and the wiring substrate 3, and thus it is possible to supply the first precharge voltage Vpr1 to all the data lines 114. After that, when the switch 205 is turned on and the switches 206 and 207 are turned off, it is possible for the driving IC 2 to supply an image signal to the electro-optical panel 100 via the output line 208, the output terminal 282, and the wiring substrate 3.

Also, in the precharge period Tpr in the horizontal scanning period H illustrated in FIG. 4, when the switch 207 is turned on, and the switches 205 and 206 are turned off, the driving IC 2 outputs the second precharge voltage Vpr2 to the electro-optical panel 100 via the output line 208, the output terminal 282, and the wiring substrate 3, and thus it is possible to supply the second precharge voltage Vpr2 to all the data lines 114. After that, when the switch 205 is turned on, and the switches 206 and 207 are turned off, it is possible for the driving IC 2 to supply an image signal to the electro-optical panel 100 via the output line 208, the output terminal 282, and the wiring line substrate 3.

First Example of Wiring Line Reinforcing Structure of Mounting Structure

Figure 6:
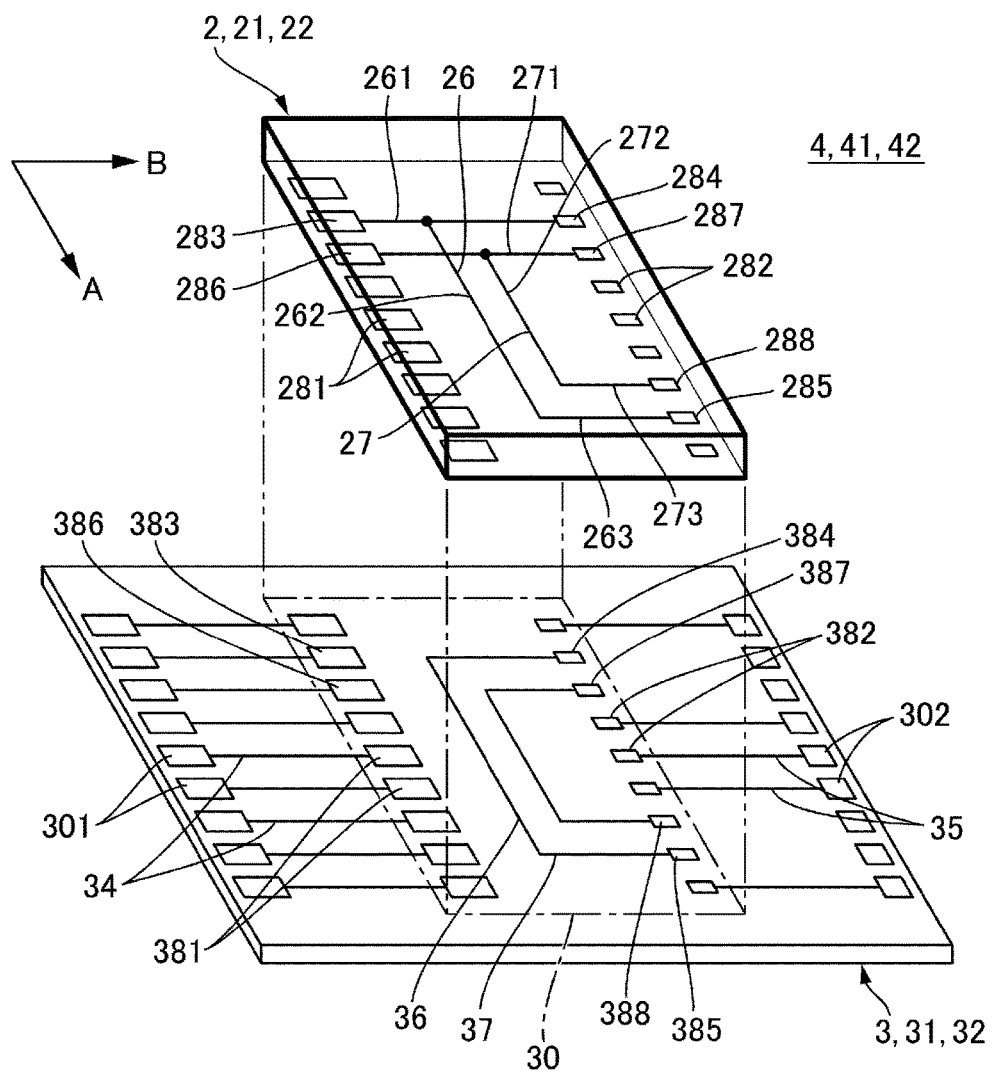
FIG. 6 is an explanatory diagram schematically illustrating a first example of a reinforcing structure of the first wiring line and the second wiring line illustrated in FIG. 5.

FIG. 6 is an explanatory diagram schematically illustrating a first example of the reinforcing structure of the first wiring line 26 and the second wiring line 27 illustrated in FIG. 5. In FIG. 6, the smaller number of terminals of the driving IC 2 and the smaller numbers of electrodes and wiring lines of the wiring substrate 3 than the actual numbers are illustrated in order for the characteristics thereof to be easily understood. Also, for the wiring lines, the circuits, and the like that are formed on the driving IC 2, only the wiring lines to which the precharge voltage Vpr is applied are illustrated. Also, in the following description, a description will be given on the assumption that the first driving IC 21 and the second driving IC 22 are not distinguished and are denoted by the driving IC 2, the first wiring line substrate 31 and the second wiring line substrate 32 are not distinguished and are denoted by the wiring substrate 3, and the first mounting structure 41 and the second mounting structure 42 are not distinguished and are denoted by the mounting structure 4.

In the mounting structure 4 illustrated in FIG. 6, a plurality of input electrodes 301 that are connected to an upper circuit (not illustrated in FIG. 6) are arranged on one end located on the opposite side of the electro-optical panel 100 on the wiring substrate 3. On the other end, a plurality of output electrodes 302 that are connected to the electro-optical panel 100 are formed. Also, a mounting area 30 in which the driving IC 2 is mounted is formed between the input electrode 301 and the output electrode 302 of the wiring substrate 3.

In the mounting area 30, electrodes 381 on which input terminals 281 of the driving IC 2, and the like are connected are arranged on the end of the side of the input electrode 301 along one direction A. The electrodes 381 includes electrodes 383 to which the input terminals 283 of the driving IC 2 are connected respectively and electrodes 386 to which the input terminals 286 of the driving IC 2 are connected respectively. Each of the plurality of input electrodes 301 is connected to a corresponding one of the plurality of electrodes 381 via the wiring line 34. Also, in the mounting area 30, a plurality of electrodes 382 to which the output terminals 282 of the driving IC 2 are connected are arranged on the end of the side of the output electrodes 302 along one direction A. Each of the plurality of electrodes 382 is connected to a corresponding one of the plurality of output electrodes 302 via wiring lines 35.

On the wiring substrate 3, two electrodes 384 and 387 that are not connected to the wiring lines 35 are formed in adjacent areas on the opposite side in one direction A of the area in which the plurality of electrodes 382 are arranged. Two electrodes 385 and 388 that are not connected to the wiring lines 35 are formed in the area on the opposite side of the electrodes 384 and 387 with respect to the plurality of electrodes 382 (the area separated from the electrodes 384 and 387 in one direction A). On the other hand, on the driving IC 2, a terminal 284 to be connected to the electrode 384 and a terminal 287 to be connected to the electrode 387 are formed in the adjacent areas on the opposite side in one direction A of the area in which the plurality of output terminals 282 are arranged. Also, on the driving IC 2, a terminal 285 to be connected to the electrode 385 and a terminal 288 to be connected to the electrode 388 are formed in an area opposite to the terminals 284 and 287 with respect to the plurality of output terminals 282 (area separated from the terminals 284 and 287 in one direction A).

In the present embodiment, the terminal 284 is disposed at a position separated from the input terminal 283 in the other direction B, and the terminal 287 is disposed at a position separated from the input terminal 286 in the other direction B. Accordingly, on the wiring substrate 3, the electrode 384 is disposed at a position separated from the electrode 383 in the other direction B, and the electrode 387 is disposed at a position separated from the electrode 386 in the other direction B.

In the present embodiment, the relationships between each of the input terminals 283, the terminals 284 and 285, the electrodes 383, 384, and 385 and the "first terminal", the "second terminal", the "third terminal", the "first electrode", the "second electrode", and the "third electrode" according to the invention are as follows.

The input terminals 283=The "first terminal" in the invention

The terminal 284=The "second terminal" in the invention
The terminal 285=The "third terminal" in the invention
The electrode 383=The "first electrode" in the invention
The electrode 384=The "second electrode" in the invention
The electrode 385=The "third electrode" in the invention In the mounting structure 4 configured in this manner, the end of the first wiring line 26 on the opposite side in one direction A is connected to the input terminal 283 (first terminal), and the input terminal 283 is connected to the electrode 383 (first electrode). Accordingly, the wiring substrate 3 supplies the first precharge voltage Vpr1 to the first wiring line 26 only via the end of the first wiring line 26 on the opposite side in one direction A. Here, the first wiring line 26 includes a first portion 261 that connects the input terminal 283 (first terminal) and the terminal 284 (second terminal), a second portion 262 that extends from the first portion 261 in one direction A, and a third portion 263 that extends from the second portion 262 and connects to the terminal 285 (third terminal). Also, the wiring substrate 3 includes a first reinforcing line 36 disposed at a position overlapping the driving IC 2 and electrically connected in parallel with the first wiring line 26. In the present embodiment, the first reinforcing line 36 is connected to the electrode 384 (second electrode) and the electrode 385 (third electrode), and electrically connected to the ends on both sides of the first wiring line 26 in the extending direction.

Also, in the mounting structure 4 according to the present embodiment, the end of the second wiring line 27 in the opposite side in one direction A is connected to input terminal 286 (fourth terminal), and the input terminal 286 is connected to the electrode 386 (fourth electrode). Accordingly, the wiring substrate 3 supplies the second precharge voltage Vpr2 to the second wiring line 27 only via the end of the second wiring line 27 on the opposite side in one direction A. Here, the second wiring line 27 includes a fourth portion 271 that connects the input terminal 286 (fourth terminal) and the terminal 287 (fifth terminal), a fifth portion 272 that extends from the fourth portion 271 in one direction A, and a sixth portion 273 that extends from the fifth portion 272 and is connected to the terminal 288 (sixth terminal). Also, the wiring substrate 3 includes a second reinforcing wiring line 37 disposed at a position overlapping the driving IC 2 and electrically connected in parallel with the second wiring line 27. In the present embodiment, the second reinforcing wiring line 37 is connected to the electrode 387 (fifth electrode) and the electrode 388 (sixth electrode), and electrically connected to the ends on both sides of the second wiring line 27 in the extending direction.

Accordingly, in the electro-optical device 1 and the mounting structure 4 according to the present embodiment, the first reinforcing line 36 formed on the wiring substrate 3 is electrically connected in parallel with the first wiring line 26 extending in one direction A in the driving IC 2, and thus the same advantage as that of reducing the resistance of the first wiring line 26 is obtained. Accordingly, in one direction A in which the first wiring line 26 is extending, the voltage of the first wiring line 26 is unlikely to change. Thus, the first precharge voltage Vpr1 that is supplied to each pixel group of the first pixel group 111h and the second pixel group 111i, and the like of the electro-optical panel 100 is unlikely to vary.

Also, the second reinforcing wiring line 37 formed on the wiring substrate 3 is electrically connected in parallel with the second wiring line 27 extending in one direction A in the driving IC 2, and thus the same advantage as that of reducing the resistance of the second wiring line 27 is obtained. Accordingly, the voltage of the second wiring line 27 in one direction A in which the second wiring line 27 extends is unlikely to vary. Thus, the second precharge voltage Vpr2 supplied to each pixel group, such as the first pixel group 111h, the second pixel group 111i, and the like of the electro-optical panel 100 is unlikely to vary.

Also, since the first reinforcing line 36 and the second reinforcing wiring line 37 are disposed at a position overlapping the driving IC 2, although the wiring substrate 3 is single-sided single-layer substrate, the layouts of the first reinforcing line 36 and the second reinforcing wiring line 37 are unlikely affected by the other wiring lines on the wiring substrate 3. Also, although the wiring substrate 3 is a single-sided single-layer substrate, the first reinforcing line 36 and the second reinforcing wiring line 37 are disposed at a position overlapping the driving IC 2, and thus the first reinforcing line 36 and the second reinforcing wiring line 37 are unlikely to affect the layout of the wiring lines on the wiring substrate 3. It is therefore possible to suitably reinforce the first wiring line 26 and the second wiring line 27 formed on the driving IC 2.

Also, the first reinforcing line 36 provides the same advantage as that of reducing the resistance of the first wiring line 26, and the second reinforcing wiring line 37 provides the same advantage as that of reducing the resistance of the second wiring line 27. Accordingly, there is an advantage in that each of the electrodes 383 and 386 that supply a voltage to the first wiring line 26 and the second wiring line 27 respectively from the wiring substrate 3 and the input terminals 283 and 286 ought to be disposed at one place in the long side direction of the driving IC 2.

Second Example of Wiring Line Reinforcing Structure of Mounting Structure

Figure 7:
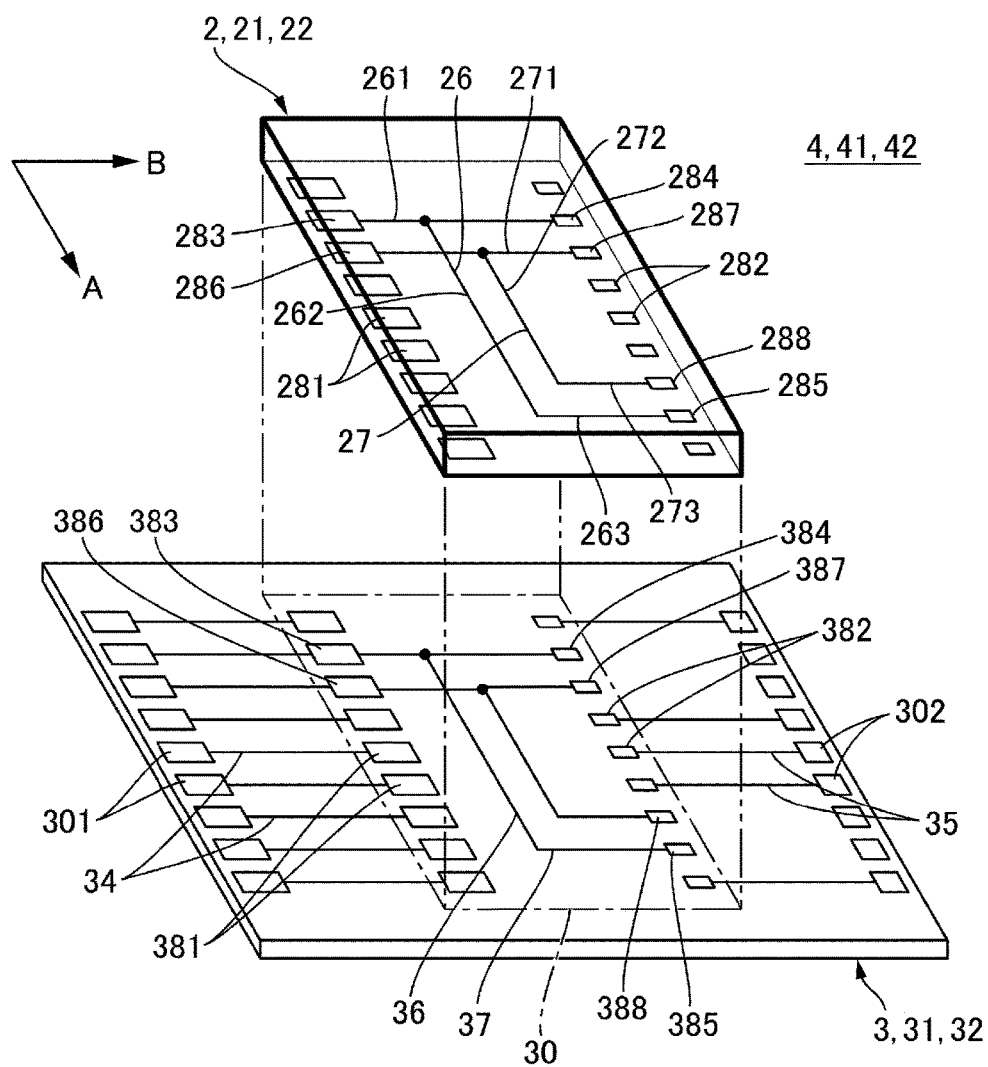
FIG. 7 is an explanatory diagram schematically illustrating a second example of a reinforcing structure of the first wiring line and the second wiring line illustrated in FIG. 5.

FIG. 7 is an explanatory diagram schematically illustrating a second example of the reinforcing structure of the first wiring line 26 and the second wiring line 27 illustrated in FIG. 5. In this regard, the basic configuration in this example is the same as the configuration illustrated with reference to FIG. 6, and thus the same reference sign is given to the common portion in the diagram, and the description thereof will be omitted.

As illustrated in FIG. 7, in the present embodiment, in the same manner as the configuration referenced FIG. 6, the first wiring line 26 includes the first portion 261 that connects the input terminal 283 (first terminal) and the terminal 284 (second terminal), the second portion 262 that extends from the first portion 261 in one direction A, and the third portion 263 that extends from the second portion 262 and is connected to the terminal 285 (third terminal). Also, the wiring substrate 3 includes the first reinforcing line 36 at the position overlapping the driving IC 2 and electrically connected in parallel with the first wiring line 26. In the present embodiment, the first reinforcing line 36 is connected to the electrode 384 (second electrode) and the electrode 385 (third electrode), is connected to the electrode 383 (first electrode) and the electrode 384 (second electrode), and is electrically connected to the ends on both sides of the first wiring line 26 in the extending direction.

Also, in the mounting structure 4 according to the present embodiment, the second wiring line 27 includes the fourth portion 271 that connects the input terminal 286 (fourth terminal) and the terminal 287 (fifth terminal), the fifth portion 272 that extends from the fourth portion 271 in one direction A, and the sixth portion 273 that extends from the fifth portion 272 and is connected to the terminal 288 (sixth terminal). Also, the wiring substrate 3 includes the second reinforcing wiring line 37 disposed at the position overlapping the driving IC 2 and electrically connected in parallel with the second wiring line 27. In the embodiment, the second reinforcing wiring line 37 is connected to the electrode 387 (fifth electrode) and the electrode 388 (sixth electrode), is connected to the electrode 386 (fourth electrode) and the electrode 387 (fifth electrode), and is electrically connected to the ends on both sides of the second wiring line 27 in the extending direction.

In such a configuration, in the same manner as the embodiment described with reference to FIG. 6, the first reinforcing line 36 formed on the wiring substrate 3 is electrically connected in parallel with the first wiring line 26 that extends in one direction A in the driving IC 2. Accordingly, the same advantage as that in the configuration described with reference to FIG. 6, such as the advantage of reducing the resistance of the first wiring line 26 is obtained.

Third Example of Wiring Line Reinforcing Structure of Mounting Structure

Figure 8:
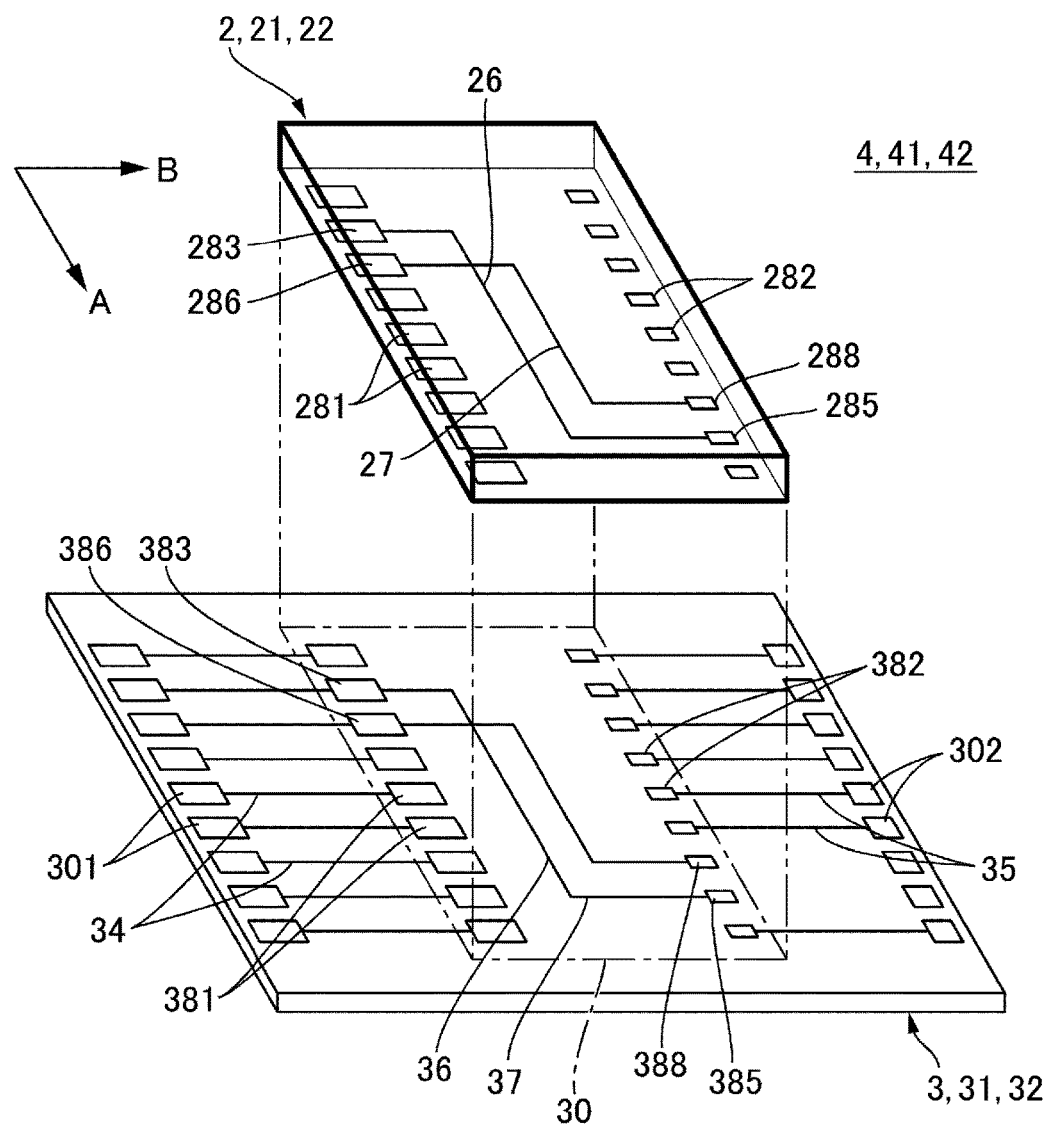
FIG. 8 is an explanatory diagram schematically illustrating a third example of a reinforcing structure of the first wiring line and the second wiring line illustrated in FIG. 5.

FIG. 8 is an explanatory diagram schematically illustrating a third example of the reinforcing structure of the first wiring line 26 and the second wiring line 27 illustrated in FIG. 5. In this regard, the basic configuration in this example is the same as the configuration illustrated with reference to FIG. 6, and thus the same reference sign is given to the common portion in the diagram, and the description thereof will be omitted.

In the mounting structure 4 illustrated in FIG. 8, on the wiring substrate 3, two electrodes 385 and 388 to which the wiring lines 35 are not connected are formed in an area separated in one direction A from the area in which a plurality of electrodes 382 are arranged, and the electrodes 384 and 387 illustrated in the FIG. 6 are not formed. On the other hand, on the driving IC 2, the terminal 285 connected to the electrode 385, and the terminal 288 connected to the electrode 388 are formed in an area separated in one direction A from the area in which a plurality of output terminals 282 are arranged, and the terminals 284 and 287 illustrated in FIG. 6 are not formed.

In the present embodiment, the relationships between each of the input terminal 283, the terminal 285, the electrodes 383 and 385, and the "first terminal", the "second terminal", the "first electrode", and the "second electrode" according to the invention are as follows.

The input terminal 283=The "first terminal" in the invention

The terminal 285=The "second terminal" in the invention

The electrode 383=The "first electrode" in the invention

The electrode 385=The "second electrode" in the invention

In the mounting structure 4 configured in this manner, the end of the opposite side of the first wiring line 26 in one direction A is connected to the input terminal 283 (first terminal), and the input terminal 283 is connected to the electrode 383 (first electrode). Accordingly, the wiring substrate 3 supplies the first precharge voltage Vpr1 to the first wiring line 26 via only the end of the first wiring line 26 on the opposite side in one direction A. Thus, in the present embodiment, the first wiring line 26 extends from the input terminal 283 (first terminal) to the terminal 285 (second terminal). Also, the wiring substrate 3 includes the first reinforcing line 36 disposed at the position overlapping the driving IC 2 and electrically connected in parallel with the first wiring line 26. In the present embodiment, the first reinforcing line 36 extends from the electrode 383 (first electrode) to the electrode 385 (second electrode) and electrically connected to the ends on both sides in the extending direction of the first wiring line 26.

Also, the end of the opposite side in one direction A of the second wiring line 27 is connected to the input terminal 286, and the input terminal 286 is connected to the electrode 386. Accordingly, the wiring substrate 3 supplies the second precharge voltage Vpr2 to the second wiring line 27 via only the end of the opposite side in one direction A of the second wiring line 27. Thus, in the present embodiment, the second wiring line 27 extends from the input terminal 286 to the terminal 288. Also, the wiring substrate 3 includes the second reinforcing wiring line 37 disposed at the position overlapping the driving IC 2 and electrically connected in parallel with the second wiring line 27. In the present embodiment, the second reinforcing wiring line 37 extends from the electrode 386 to the electrode 388 and is electrically connected to the ends on both sides in the extending direction of the second wiring line 27.

In such a configuration, in the same manner as the configuration described with reference to FIG. 6, the first reinforcing line 36 formed on the wiring substrate 3 is electrically connected in parallel with the first wiring line 26 that extends in one direction A in the driving IC 2. Accordingly, the same advantage as that in the configuration described with reference to FIG. 6, such as the advantage of reducing the resistance of the first wiring line 26 is obtained.

OTHER EMBODIMENTS

In the embodiment described above, the wiring substrate 3 is a flexible wiring substrate. However, the invention may be applied to the case where the driving IC 2 is mounted on the wiring substrate 3 made of a rigid wiring substrate. Also, in the embodiment described above, the invention has been applied to the mounting structure 4 in which the driving IC 2 is mounted on the wiring substrate 3 connected to the electro-optical panel 100. However, the invention may be applied to a mounting structure in which the driving IC 2 is subjected to COG (Chip On Glass) mounting on the element substrate 101.

Example of Mounting on Electronic Apparatus

Figure 9:
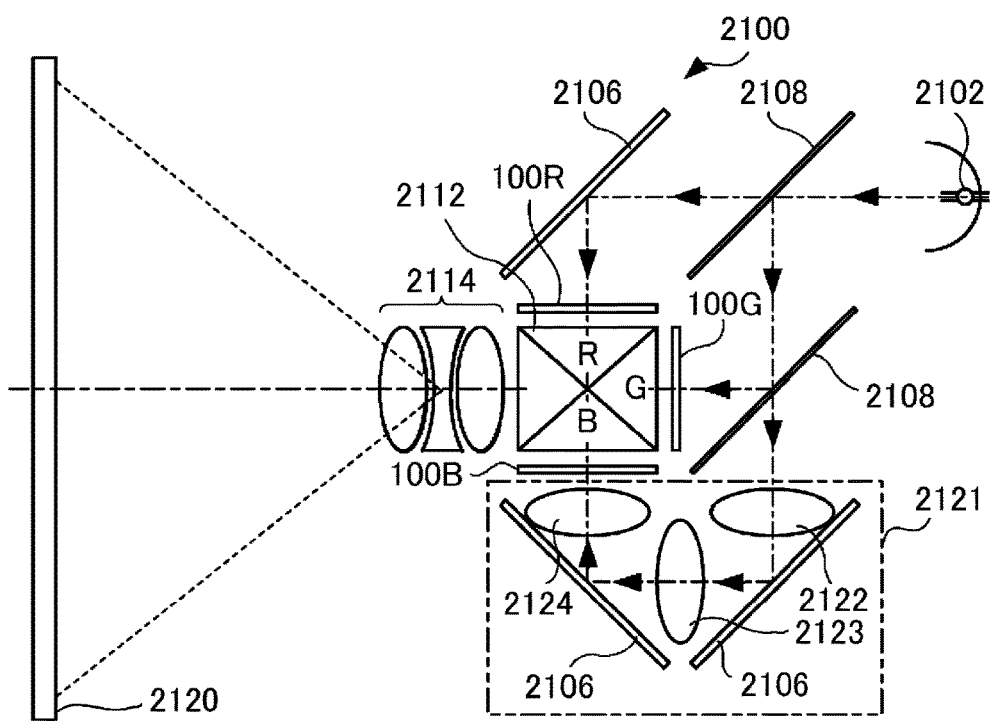
FIG. 9 is a schematic configuration diagram of a projection display device using an electro-optical device to which the invention is applied.

A description will be given of electronic apparatuses using the electro-optical device 1 according to the embodiment described above. FIG. 9 is a schematic configuration diagram of a projection display device (electronic apparatus) using the electro-optical device 1 to which the invention is applied.

A projection display device 2100 illustrated in FIG. 9 is an example of an electronic apparatus using the electro-optical device 1. The projection display device 2100 uses electro-optical devices 1 as light valves and is capable of displaying with high definition without enlarging the device. As illustrated in FIG. 9, the projection display device 2100 includes a lamp unit 2102 (light source section) including a white light source, such as a halogen lamp, or the like inside the projection display device 2100. Projection light emitted from the lamp unit 2102 is separated into three primary colors of R (Red), G (Green), and B (Blue) through three mirrors 2106 and two dichroic mirrors 2108 disposed inside the projection display device 2100. Separated projection light is guided to light valves 100R, 100G and 100B corresponding to the respective primary colors. In this regard, since B light has an optical path longer than those of R light and G light, B light is guided through a relay lens system 2121 including an incident lens 2122, a relay lens 2123 and an exit lens 2124 so as to prevent optical loss.

In the projection display device 2100, three liquid crystal devices including the electro-optical device 1 are disposed correspondingly to the respective R, G, and B colors. The configuration of each of the light valves 100R, 100G and 100B is the same as that of the electro-optical panel 100 described above. Each of the light valves 100R, 100G and 100B is connected to an upper circuit in the projection display device 2100 via the first wiring line substrate 31 and the second wiring line substrate 32. Image signals that specify grayscale levels of primary color components of the respective R, G, and B colors are supplied from an external upper circuit, processed by the upper circuit in the projection display device 2100, and drive the respective light valves 100R, 100G and 100B. Light modulated by the light valves 100R, 100G, and 100B is incident on a dichroic prism 2112 in three directions. In the dichroic prism 2112, R light and B light are deflected 90 degrees while G light goes straight through. Accordingly, the images of the respective primary colors are combined, and then a color image is projected onto a screen 2120 by a projection lens group 2114 (projection optical system).

Other Projection Display Devices

In this regard, a projection display device may be configured by using LED light sources that emit each color light, or the like as the light source section, and supplying the color light emitted from the LED light sources separately to different liquid crystal devices.

Other Electronic Apparatuses

An electronic apparatus including the electro-optical device 1 to which the invention is applied is not limited to the projection display device 2100 in the embodiment described above. For example, the electro-optical device 1 may be used for electronic apparatuses, such as a projection-type HUD (Head-Up Display), a direct viewing type HMD (Head Mounted Display), a personal computer, a digital still camera, a liquid crystal television, and the like.

This application claims priority to Japan Patent Application No. 2017-017309 filed Feb. 2, 2017, the entire disclosures of which are hereby incorporated by reference in their entireties.

What is claimed is:

1. An electro-optical device comprising:
   an electro-optical panel;
   a wiring substrate connected to the electro-optical panel; and
   a driving IC mounted on the wiring substrate,
   wherein the driving IC includes a first wiring line extending in one direction, and the wiring substrate includes a first reinforcing line disposed at a position overlapping the driving IC and electrically connected in parallel with the first wiring line.

2. The electro-optical device according to claim 1,
   wherein the first reinforcing line is electrically connected to ends on both sides of the first wiring line in the extending direction.

3. An electronic apparatus comprising:
   the electro-optical device according to claim 2.

4. The electro-optical device according to claim 1,
   wherein the wiring substrate supplies power to an end on the opposite side of the first wiring line in the one direction.

5. An electronic apparatus comprising:
   the electro-optical device according to claim 4.

6. The electro-optical device according to claim 1,
   wherein the driving IC includes a plurality of output circuits arranged in the one direction, and the first wiring line supplies power to each of the plurality of output circuits.

7. The electro-optical device according to claim 6,
   wherein the electro-optical panel includes
   a first pixel group in which a plurality of first pixel columns including a plurality of first pixels arranged along a first direction are arranged along a second direction crossing the first direction,
   a second pixel group in which a plurality of second pixel columns including a plurality of second pixels arranged along the first direction are arranged along the second direction, and
   a selection circuit for selecting the first pixel column and the second pixel column to be supply destinations of an image signal from each of the first pixel group and the second pixel group, and
   the driving IC includes
   a first output terminal that outputs the image signal to be supplied to the first pixel group and a second output terminal that outputs an image signal to be supplied to the second pixel group at a separated position in the one direction, wherein the plurality of output circuits output a precharge voltage supplied to the first pixel group and the second pixel group from the first wiring line via the first output terminal and the second output terminal.

8. An electronic apparatus comprising:
the electro-optical device according to claim 7.

9. An electronic apparatus comprising:
the electro-optical device according to claim 6.

10. The electro-optical device according to claim 1,
wherein the driving IC includes a first terminal to which the first wiring line is connected, a second terminal separated from the first terminal in the other direction crossing the one direction, and a third terminal separated from the first terminal and the second terminal in the one direction, and
the wiring substrate includes a first electrode to which the first terminal is connected, a second electrode to which the second terminal is connected, a third electrode to which the third terminal is connected, and a wiring line supplying power to the first wiring line via the first electrode, and
the first wiring line includes a first portion that connects the first terminal and the second terminal, a second portion extending from the first portion in the one direction, and a third portion extending from the second portion and is connected to the third terminal,
wherein the first reinforcing line is extending from the second electrode to the third electrode.

11. The electro-optical device according to claim 10,
wherein the first reinforcing line is further extending from the first electrode to the second electrode.

12. An electronic apparatus comprising:
the electro-optical device according to claim 10.

13. The electro-optical device according to claim 1,
wherein the driving IC includes a first terminal to which the first wiring line is connected and a second terminal separated from the first terminal in the one direction, and
the wiring substrate includes a first electrode to which the first terminal is connected, a second electrode to which the second terminal is connected, and a wiring line supplying power to the first wiring line via the first electrode, wherein the first wiring line is extending from the first terminal to the second terminal, and
the first reinforcing line is extending from the first electrode to the second electrode.

14. The electro-optical device according to claim 1,
wherein the driving IC includes a second wiring line extending in the one direction, and
the wiring substrate includes a second reinforcing wiring line disposed at a position overlapping the driving IC and electrically connected in parallel with the second wiring line.

15. The electro-optical device according to claim 1,
wherein the wiring substrate is a single-layer substrate including wiring lines on a same metal layer.

16. The electro-optical device according to claim 1,
wherein the wiring substrate is a flexible wiring substrate.

17. The electro-optical device according to claim 1,
wherein a plurality of the wiring substrates including the driving IC mounted thereon are connected to the electro-optical panel.

18. An electronic apparatus comprising:
the electro-optical device according to claim 1.

19. A mounting structure comprising:
a wiring substrate; and
a driving IC mounted on one surface of the wiring substrate,
wherein the driving IC includes a first wiring line extending in one direction, and
the wiring substrate includes a first reinforcing line disposed at a position overlapping the driving IC and electrically connected in parallel with the first wiring line.

20. The mounting structure according to claim 19,
wherein the driving IC further includes a second wiring line extending in the one direction, and
the wiring substrate further includes a second reinforcing wiring line disposed at a position overlapping the driving IC and electrically connected in parallel with the second wiring line.

* * * * *